United States Patent [19]

Okamoto et al.

[11] Patent Number: 5,206,574
[45] Date of Patent: Apr. 27, 1993

[54] VECTOR CONTROL APPARATUS FOR INDUCTION MOTOR

[75] Inventors: Kiyokazu Okamoto; Hideyuki Amagai, both of Tokyo, Japan

[73] Assignee: NEC Corporation, Japan

[21] Appl. No.: 341,300

[22] Filed: Apr. 19, 1989

Related U.S. Application Data

[63] Continuation of Ser. No. 44,818, Apr. 30, 1987, abandoned.

[30] Foreign Application Priority Data

| May 2, 1986 | [JP] | Japan | 61-102666 |
| May 2, 1986 | [JP] | Japan | 61-102667 |
| May 2, 1986 | [JP] | Japan | 61-102668 |

[51] Int. Cl.$^5$ .............................. H02P 3/00
[52] U.S. Cl. .................... 318/800; 318/268
[58] Field of Search ............... 318/799-812, 318/52, 51, 59, 66, 268, 779; 388/805, 806, 813, 967.5, 916, 930

[56] References Cited

U.S. PATENT DOCUMENTS

| 4,392,100 | 7/1983 | Stanton et al. | 318/811 |
| 4,456,868 | 6/1984 | Yamamura et al. | 318/800 |
| 4,672,287 | 6/1987 | Fujioka et al. | 318/806 |

FOREIGN PATENT DOCUMENTS 0075023 3/1983 European Pat. Off. .

OTHER PUBLICATIONS

"Modern Technology Series", 1982.

Primary Examiner—A. Jonathan Wysocki
Attorney, Agent, or Firm—Ostrolenk, Faber, Gerb & Soffen

[57] ABSTRACT

A vector control apparatus for an induction motor that controls the speed of the induction motor by providing the motor with a speed command and a secondary magnetic flux command from outside. The vector control apparatus includes a vector control system operative in such a way as to maintain a vector relation equation between a torque current, an exciting current, a slip speed, a secondary magnetic flux command, on the one hand, and a torque T, on the other, of the induction motor; and memory system means for storing a predetermined relationship between the torque T, the detected speed value $\omega_r$, of the motor, and the secondary magnetic flux command obtained from the vector control system. The torque T obtained from the vector control system is inputted to the memory system and the secondary magnetic flux is outputted and fed back therefrom to the vector control system. In the predetermined relationship, when he torque T is large, the secondary magnetic flux $\phi_2$ is increased in such a way as to reduce the slip speed within a range where the motor loss L to the torque T ratio (T/L) can reach the maximum value, and when the torque T is small and the speed is less than a predetermined value, the secondary magnetic flux $\phi_2$ is reduced in such a way as to increase the slip speed and reduce the speed ripple within the range where the motor loss L can be allowed.

1 Claim, 7 Drawing Sheets

VECTOR CONTROL APPARATUS FOR INDUCTION MOTOR

This is a continuation of application Ser. No. 07/044,818 filed on Apr. 30, 1987, now abandoned.

BACKGROUND OF THE INVENTION

The present invention relates to a vector control apparatus for an induction motor and, more particularly, to a vector control apparatus for an induction motor wherein rotational smoothness of the motor at a low rotation speed with a small torque can be greatly improved and a loss of the motor with a large torque can be greatly reduced.

Conventional induction motors have been used as constant speed motors using a power source of a predetermined frequency in a variety of applications due to rigidness and low cost.

Along with the recent development of electronic devices, microcomputers, and software, a power source having a wide variable frequency range can be obtained to drive an induction motor. The field of applications of the induction motors is changing from constant speed motors to servo motors. The variable frequency power source is operated according to vector control.

Basic parameters in vector control are a torque current $i_{1q}$, an exciting current $i_0$ for generating a secondary flux $\Phi_2$, and a slip speed $\omega_s$ and are defined as follows:

$$i_{1q} = (L_{22}/M)(T/\Phi_2) \quad (1)$$

$$i_0 = \{(\Phi_2 + (L_{22}/R_2)\cdot(d\Phi_2/dt)\}/M \quad (2)$$

$$\omega_s = TR_2/\Phi_2^2 = (R_2/L_{22})\cdot(i_{1q}/i_0) \quad (3)$$

for the steady state, i.e., $d\Phi_2/dt = 0$ where $L_{22}$ is the inductance of the secondary winding, M is the mutual inductance between the primary and secondary windings, T is the torque, $\Phi_2$ is the flux generated by the secondary winding and crossing with the primary winding, and $R_2$ is the resistance of the secondary winding. Relational equations (1), (2), and (3) are referred to as vector relational equations.

The secondary flux $\Phi_2$ is a predetermined value in vector control The torque T is a command value supplied to the vector controller for $d\Phi_2/dt = 0$ as follows:

$$T = (M^2/R_2)\omega_s i_0^2 = (M^2/L_{22}) i_0 i_{1q} \ldots \quad (4)$$

That is, a so-called inverter is controlled by the slip speed $\omega_s$, the exciting current $i_0$, and the torque current $i_{1q}$ to supply power to the induction motor so as to allow the motor to operate at desired ratings.

FIG. 1 is a block diagram of a conventional vector control system shown in "New Drive Electronics", Naohiko Kamiyama, P. 205. In other words, FIG. 1 shows a basic arrangement of conventional "slip frequency type vector control".

Referring to FIG. 1, reference numeral 1 denotes a speed control amplifier for generating a torque T; 2, a divider; 3, a constant setter for outputting the torque current $i_{1q}$; 4, a vector analyzer; 5, a multiplier; 6, a converter; 7, a current amplifier; 8, a power converter; 9, an induction motor; 11, a speed detector; 12, a differentiator; 13, 14, 15, and 16, constant setters for generating the exciting current $i_0$; 17, a divider for generating the slip speed $\omega_s$; 18, a vector oscillator; and 20, an adder. With the above arrangement, the torque can be controlled in accordance with an instantaneous current. Please refer to PP. 205-206 in the above reference for the operation of the circuit shown in FIG. 1.

In the case of the slip frequency type vector control circuit shown in FIG. 1, an expected value $\Phi_E$ of the secondary flux $\Phi_2$ is generally constant within the entire rotation speed range and the entire torque range (this is referred to as constant torque characteristics, so that an output from the induction motor is increased in proportion to the motor rotation speed), as shown in FIG. 2.

If a constant output of the induction motor in a high-speed range is required, the secondary flux $\Phi_2$ is kept constant at a rotation speed below a predetermined rotation speed $\omega_{r11}$, as shown in FIG. 3. However, at a rotation speed exceeding the predetermined rotation speed $\omega_{r11}$, the secondary flux $\Phi_2$ is in inverse proportion to the rotation speed $\omega_r$ (i.e., constant output characteristics). In this case, the secondary flux $\Phi_2$ is a function of the rotation speed $\omega_r$.

However, if the induction motor is used as a servo motor, the following problems are presented. The servo motor must satisfy the following requirements: (1) smooth rotation, i.e., a small variation in rotation speed is required in mainly a low-speed range in order to achieve high-precision control, for example, in table feed finish machining in a machine tool; and (2) a heat loss must be minimized and a torque must be maximized in a high-output operation in, e.g., table feed coarse machining in the machine tool.

In conventional slip frequency type vector control, the requirements of the servo motor cannot be sufficiently satisfied. More specifically, the loss of the output in a high torque operation cannot be reduced and smooth rotation at a low speed with a small load cannot be achieved.

SUMMARY OF THE INVENTION

It is an object of the present invention to provide a vector control apparatus for an induction motor wherein a loss can be reduced in an operation with a high torque, and smooth rotation at a small load can be achieved.

A vector control apparatus according to the present invention comprises:

A vector control system and a memory system; said vector control system comprising:

i) means for generating a torque command T using a speed command $\dot{\omega}_r$ and an actual rotation speed $\omega_r$ obtained from means for detecting a rotation speed of said induction motor;

ii) means for receiving said torque command T and a secondary flux command $\phi_2$ and calculating, on the basis of a vector relational equation, an exciting current $i_0$, a torque current $i_{1q}$, and a slip speed $\omega_s$, using the predetermined circuit constants of said induction motor, including an inductance, and a resistance; and iii) means for supplying predetermined three-phase current using said $i_0$, $i_{1q}$, and $\omega_s$, to said induction motor, including a vector analyzer, a vector oscillator, and a three-phase signal generator, and also to a current control amplifier and a power amplifier;

said memory system being supplied with either or both of said torque command T and said actual rotation speed $\omega_r$ from said vector control system, and comprising:

signal conversion means for converting said torque command T and said actual rotation speed $\omega_r$ into corresponding data;

memory means for receiving said data corresponding to said torque command T or said actual rotation speed $\omega_r$, or both and generating data corresponding to a desired secondary magnetic flux $\phi_2$ in accordance with a predetermined magnetic flux relation; and signal conversion means for converting said data corresponding to a desired secondary magnetic flux $\phi_2$ to said secondary magnetic flux $\phi_2$ to a magnetic flux command;

said magnetic flux command being fed back as a secondary magnetic flux command to be used in said vector control system;

said predetermined magnetic flux relation between T, $\omega_r$, and $\phi_2$ being determined such that when T is large the secondary magnetic flux $\phi_2$ is increased, within a range where the ratio of the motor loss L to T (T/L) can reach a maximum value, in such a way as to minimize the slip speed $\omega_s$, and when T is small and said actual rotation speed is less than a predetermined value, the secondary magnetic flux $\phi_2$ is reduced in such a way as to reduce ripple of said actual rotation speed $\omega_r$, and to increase said slip speed $\omega_s$, within an allowable range of the loss L.

DETAILED DESCRIPTION OF THE PREFERRED EMBODIMENTS

Figure 1:
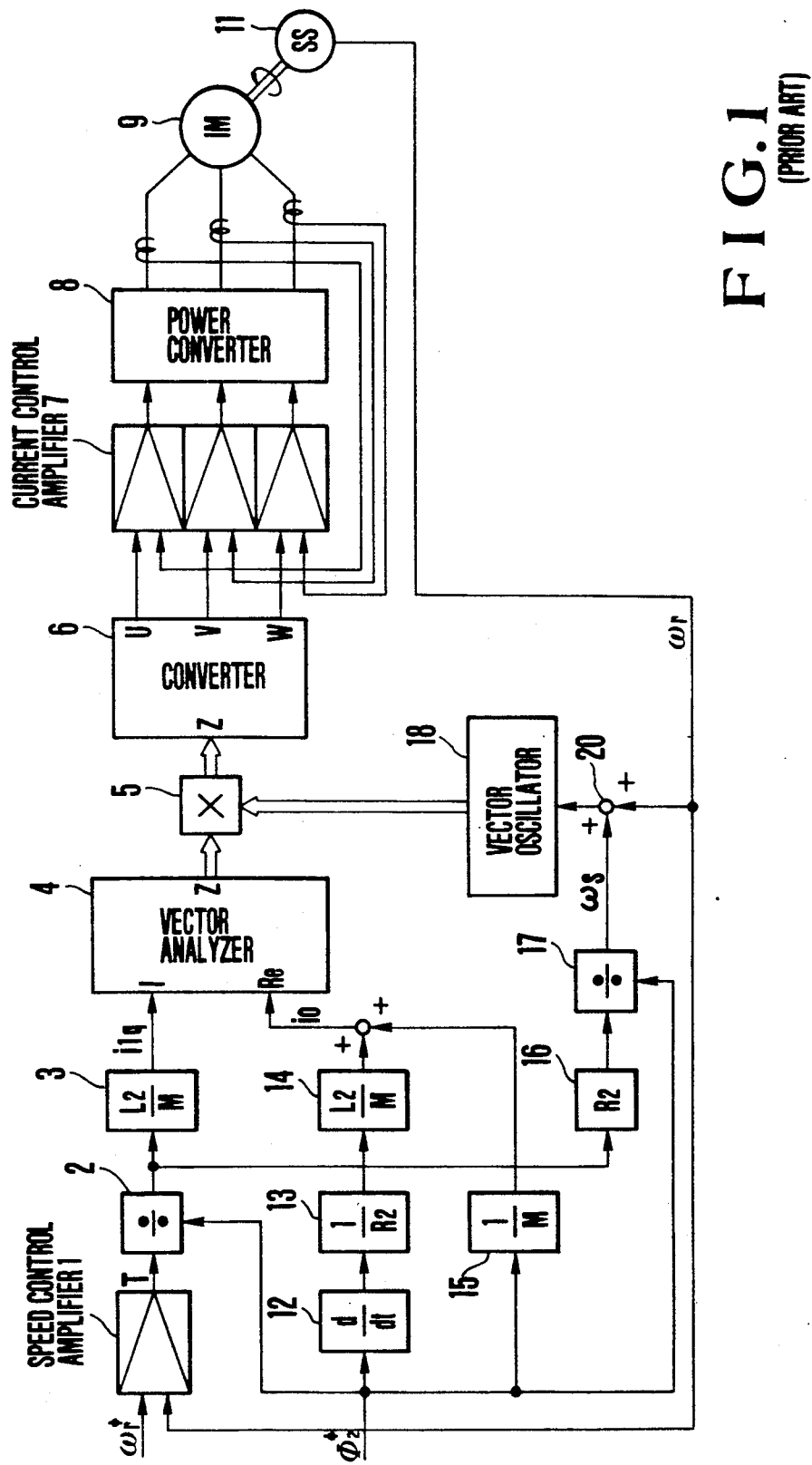
FIG. 1 is a block diagram of a conventional vector control apparatus for an induction motor.
Figure 2:
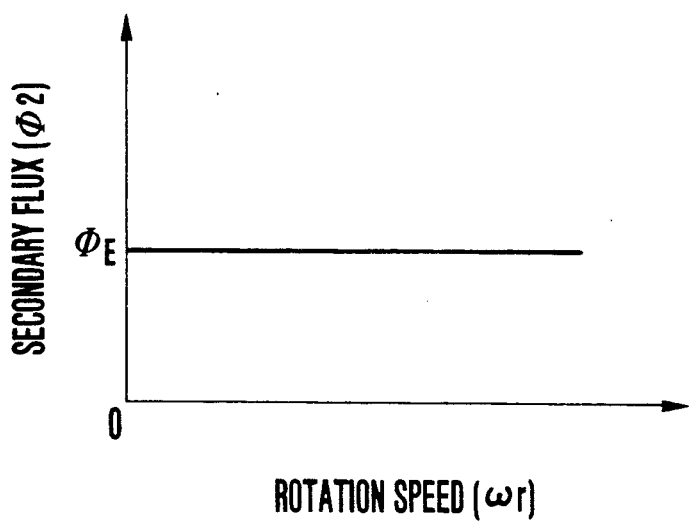
FIGS. 2 and 3 are graphs for explaining the operation of the vector control apparatus shown in FIG. 1.
Figure 3:
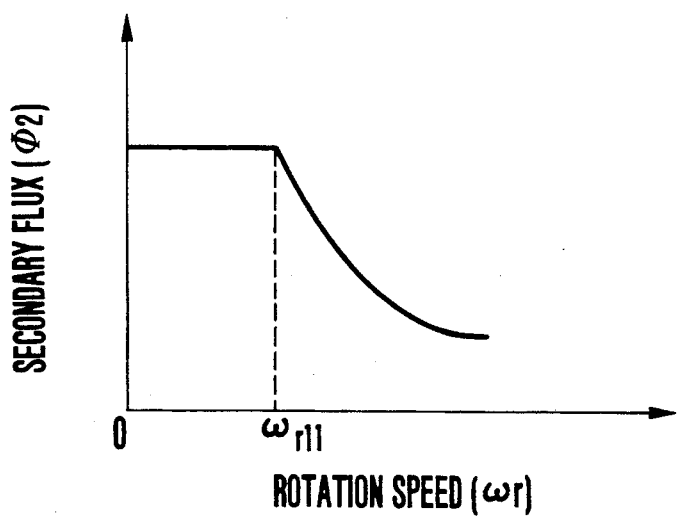

The principle of the present invention will be described so as to best understand the present invention prior to a description of a preferred embodiment.

In general, when a load such as a machine tool is driven, a large torque at a load-side portion on which a torque (force) acts causes a stress when a large torque acts on the load. In this case, a high output must be generated. A loss caused by heat dissipation of the induction motor must be minimized even if smooth rotation thereof is sacrificed. Losses of the induction motor are classified into a copper loss, a core loss, and a mechanical loss. Of these losses, the copper loss is the major loss. The copper loss is increased in proportion to the square the primary and secondary currents. The core loss is regarded to increase in proportion to the 1.6 to second power of the flux density (which is proportional to the exciting current if a relatively small hysteresis loss is neglected) and to the square (second power) of a primary frequency $\omega_1$ of power applied to the induction motor. For the sake of simplicity, the core loss is assumed to increase in proportion to the square of the flux density or the exciting current.

The mechanical loss is generated by other causes and will not be described herein.

In order to reduce the loss, reduction of the losses with respect to the exciting current $i_0$ and the torque current $i_{1q}$ is very important.

The main components of the loss L can be represented as follows:

$$L = R_1 i_1^2 + R_2 i_2^2 + a\omega_1^2 i_0^2 \tag{5}$$

for $i_1^2 = i_0^2 + i_{1q}^2$ $i_2^2 = (M i_{1q}/L_{22})^2$ $a = \text{constant}$ In equation (5), the first and second terms correspond to the copper loss, and the third term corresponds to the core loss.

If $R_1' = R_1 + a\omega_1^2$, then $$L = R_1' i_0^2 + (R_1 + R_2 M^2/L_{22}^2) i_{1q}^2 \tag{6}$$

Equations (1) and (3) yield $$i_{1q}^2 = (L_{22}^2/M^2) \cdot (T^2/\Phi_2^2) = (T/M^2) \cdot (L_{22}^2/R_2) \cdot \omega_s$$

A substitution of this equation into equation (6) yields the following equation relating the loss L and the torque T:

$$L = (T/M^2)[(R_1' R_2/\omega_s + (R_1/R_2) \times (L_{22}^2 + R_2 M^2/R_1)\omega_s] \tag{7}$$

Equation (7) can be rewritten as follows:

$$L = (T/M^2) \left[ \left\{ \sqrt{R_1' R_2/\omega_s} - \sqrt{(R_1/R_2)} \times \sqrt{(L_{22}^2 + R_2 M^2/R_1)\omega_s} \right\}^2 + 2\sqrt{R_1' R_1} \sqrt{L_{22}^2 + R_2 M^2/R_1} \right] \tag{8}$$

$$\geq 2(T/M^2) \sqrt{R_1' R_1} \sqrt{L_{22}^2 + R_2 M^2/R_1} \tag{9}$$

(L is equal to the right-hand side if $\omega_s = 10 \sqrt{R_1'/R_1} \cdot R_2 / \sqrt{L_{22}^2 + R_2 M^2/R_1}$)

That is, $$T/L = M^2 / \{(R_1' R_2/\omega_s) + (R_1/R_2)(L_{22}^2 + R_2 M^2/R_1)\omega_s\} \leq M^2/2 \sqrt{R_1' R_1} \sqrt{L_{22}^2 + R_2 M^2/R_1} \tag{10}$$

(T/L is equal to the right-hand side

-continued if $\omega_s = (\sqrt{R_1'/R_1} \cdot R_2)/\sqrt{L_{22}^2 + R_2M^2/R_1}$, that is, T/L = maximum.)

A relationship between a speed variation $\Delta\omega_r$ and a harmonic component $\Delta T$ of the torque T is calculated. The speed variation $\Delta\omega_r$ is calculated by the equation of motion of the rotor of the induction motor as follows:

Equation of Motion:

$$Jd(\omega_r + \Delta\omega_r)/dt + Dr(\omega_r + \Delta\omega_r) + T_L = Ta + \Delta T \quad (11)$$

where J is the inertia, Dr is the speed viscosity coefficient, $\omega_r$ is the rotation speed, $T_L$ is the torque loss, and Ta is the output torque.

In the steady state, $$d\omega_r/dt = 0 \text{ and } Dr\omega_r + T_L = Ta$$

therefore $$Jd\Delta\omega_r/dt + Dr\Delta\omega_r = \Delta T \quad (12)$$

If a harmonic component of the first order frequency $\omega_1$ is given as $mp\omega_1$, where p is the number of pole pairs, then $$\Delta\omega_r = \Delta T/\sqrt{(Jmp\omega_1)^2 + Dr^2} \leq \Delta T/Jmp\omega_1 \quad (13)$$

Since $\omega_1 = \omega_r + \omega_s$, then $$\Delta\omega_r = (\Delta T/Jmp)\{1/(\omega_r + \omega_s)\} \quad (14)$$

In order to reduce $\Delta\omega_r$ at a given torque harmonic component $\Delta T$, $\omega_s$ is increased. If $\omega_s$ is multiplied with $k^2$, equation (14) can be rewritten as follows:

$$\Delta\omega_r = (\Delta T/Jmp) \times \{1/(\omega_r + k^2/\omega_s)\} \quad (15)$$

The term $\Delta T/Jmp$ in equation (15) is a constant, and the term $1/(\omega_r + k^2/\omega_s)$ is a variable. In the variable, i.e., $1/(\omega_r + k^2/\omega_s)$ in equation (15), if the rotation speed $\omega_r$ is low, the speed variation $\Delta\omega_r$ can be reduced by increasing k. That is, if the value of the rotation speed $\omega_r$ is small, the speed variation $\Delta\omega_r$ can be reduced by increasing the slip speed $\omega_s$.

Figure 4:
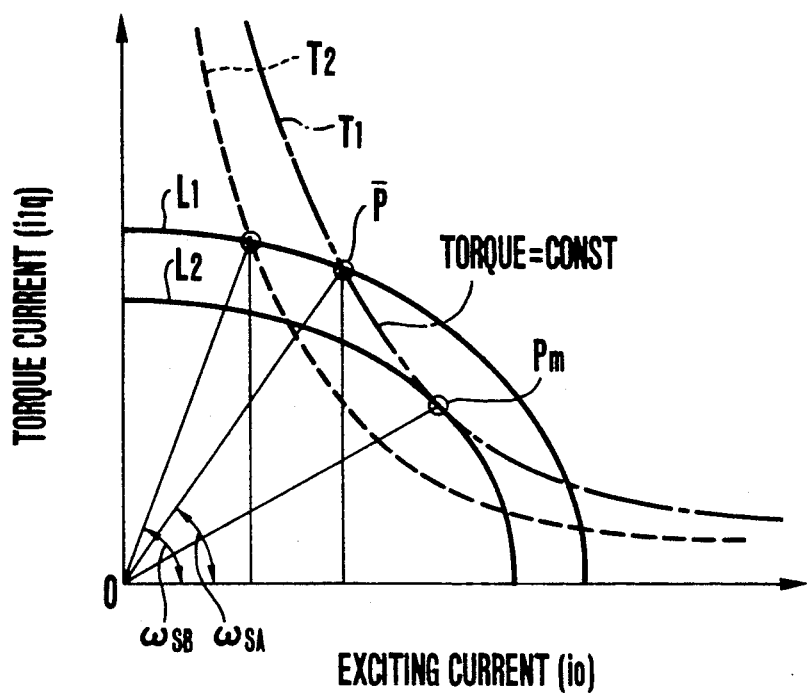
FIG. 4 is a graph for explaining the principle of operation of the present invention.

As is apparent from the above description, in order to increase the T/L or decrease the $\Delta\omega_r$, the most important factor is the slip speed $\omega_s$. A relationship between the torque T, the loss L, and the slip speed $\omega_s$ will be described with reference to FIG. 4 showing a coordinate system plotting $i_0$ and $i_{1q}$ along the abscissa and ordinate. The loss L is given by equation (6) described above:

$$L = R_1'i_0^2 + (R_1 + R_2M^2/L_{22}^2)i_{1q}^2 \quad (6)$$

Equation (6) indicates that $i_0$ and $i_{1q}$ for a constant loss L form a part of a ellipse as shown with, for example, symbols $L_1$ and $L_2$ in FIG. 4.

At the same time, the torque T is defined by equation (4):

$$T = (M^2/L_{22})i_0 i_{1q} \quad (b\ 4)$$

The "torque T=a constant curve" in the $i_0$-$i_{1q}$ coordinate system is a hyperbola as shown with, for example, $T_1$ and $T_2$ in FIG. 4.

An allowable heat loss of the induction motor is predetermined. When a specific torque T is given, the upper limit of the slip speed $\omega_s$ as a function of the allowable loss L is determined. For example, referring to FIG. 4, upper limits of slip speeds $\omega_s$ for the torques $T_1$ and $T_2$ at the allowable loss $L_1$ are calculated. For example, upper limit values $\omega_{s1}$ of the slip speeds $\omega_s$ for the torques $T_1$ and $T_2$ at the allowable loss $L_1$ are $\omega_{sA}$ and $\omega_{sB}$, respectively.

If a ratio $(\omega_{sE}/\omega_{s1})$ of an expected value $\omega_{sE}$ to a slip speed upper limit value $\omega_{s1}$ is given as $k_0^2$, $k_0^2$ is the maximum value. That is, if $k_0^2$ is increased, the loss exceeds the allowable heat loss. In other words, when the slip speed $\omega_s$ is increased, the loss is increased. The advantage obtained by increasing the slip speed $\omega_s$ is given as follows.

Since the slip speed $\omega_s$ is given as a function of the torque T as in equation (3), the slip speed $\omega_s$ is larger than the rotation speed $\omega_r$ at a low speed with a large torque T. If the $k_0$ is larger than 1, $k_0^2\omega_s$ is larger than $\omega_r$. For this reason, when $\omega_r$ shown in equation (15) is small, the speed variation $\Delta\omega_r$ falls within a sufficiently narrow range.

The induction motor as the servo motor has a structure for inhibiting electromagnetic saturation even if a large torque for acceleration or deceleration is required. Therefore, the induction motor is regarded to have a structure wherein the motor is not electromagnetically saturated even if an exciting or torque current is partially increased or decreased.

By properly selecting the slip speed $\omega_s = (R_2/L_{22})(i_{1q}/i_0)$, i.e., a ratio of the exciting current $i_0$ and the torque current $i_{1q}$, the loss L can be minimized. In addition, the speed variation $\Delta\omega_r$ can be reduced.

The present invention is based on the principle described above.

Figure 5:
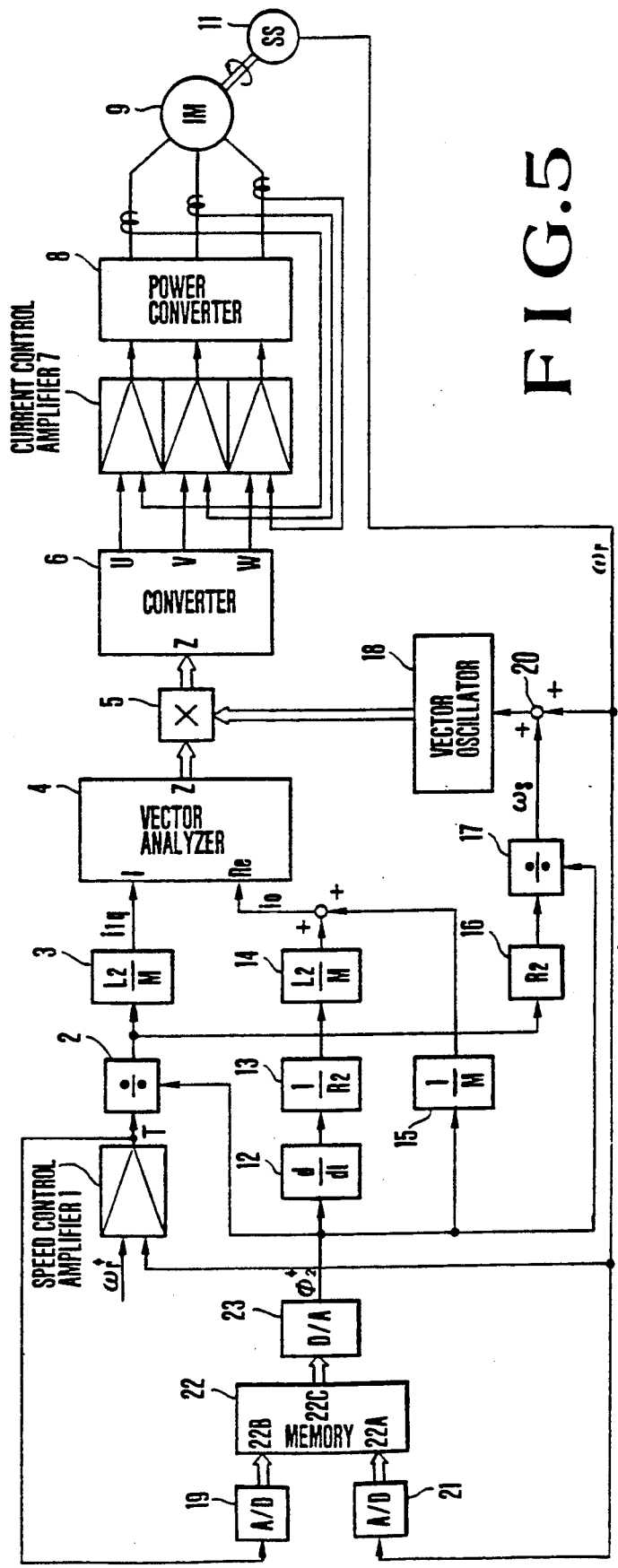
FIG. 5 is a block diagram of an induction motor control apparatus according to an embodiment of the present invention.

FIG. 5 is a block diagram of a vector control apparatus for an induction motor according to an embodiment of the present invention. The same reference numerals as in FIG. 1 denote the same parts in FIG. 5, and a detailed description thereof will be omitted.

Figure 10:
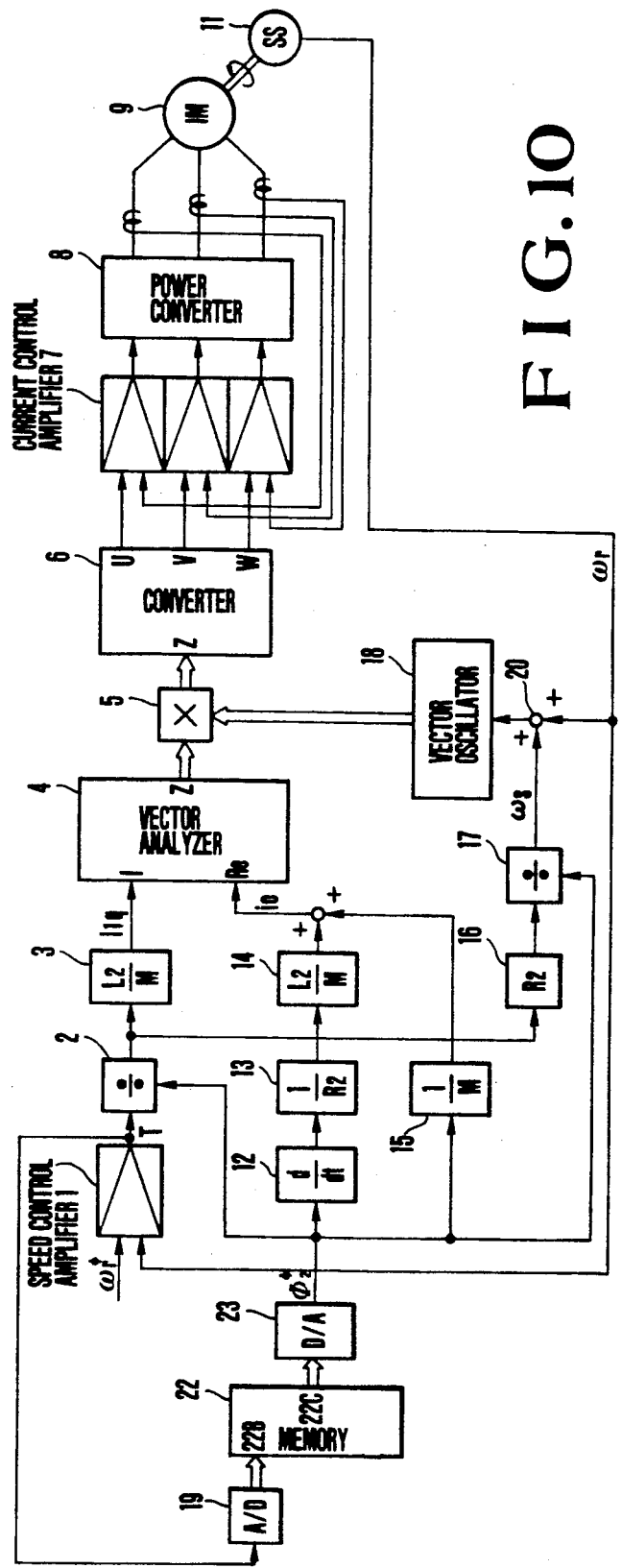
FIG. 10 is a block diagram of a vector control apparatus according to another embodiment of the present invention.
Figure 11:
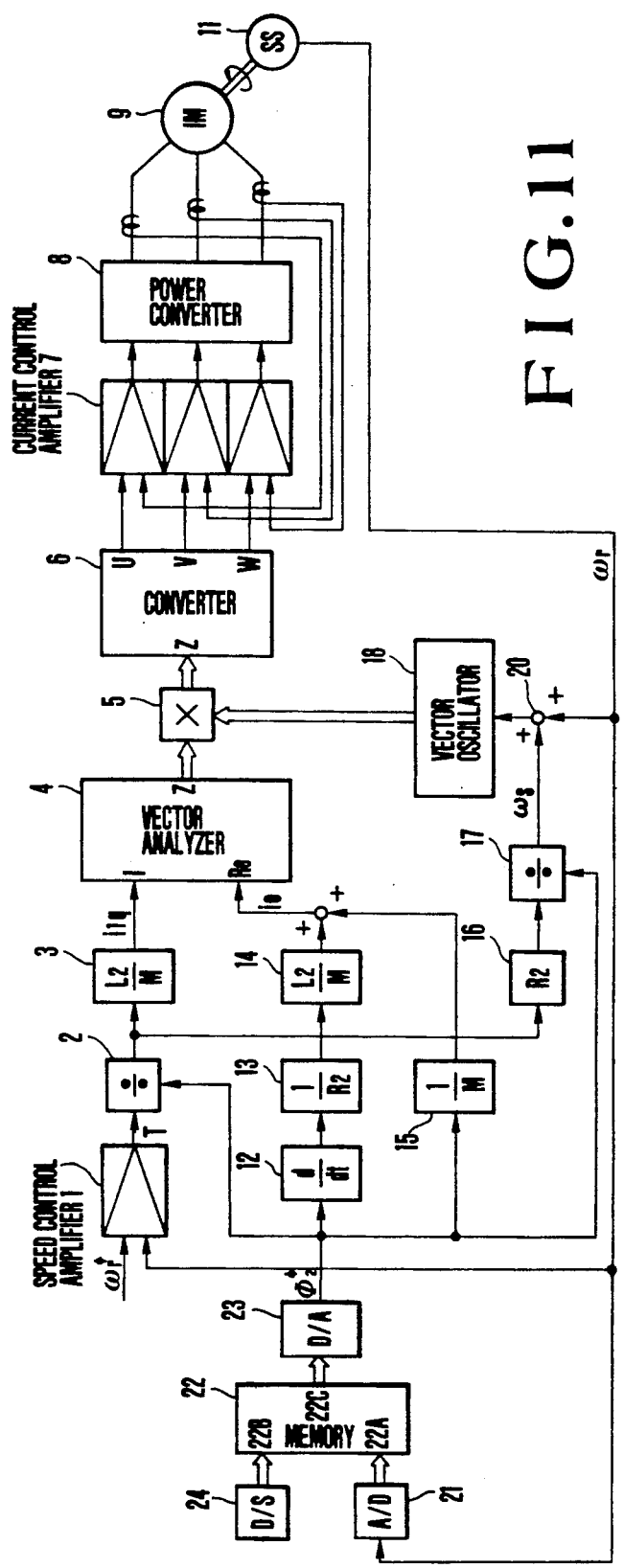
FIG. 11 is a block diagram of a vector control apparatus according to still another embodiment of the present invention.

Referring to FIG. 5, a signal representing the rotation speed $\omega_r$ from a speed sensor 11 is input to a speed control amplifier 1. This signal is A/D-converted by an A/D converter 21. The output terminal of the A/D converter 21 is connected to an input terminal 22A of a memory 22. The output terminal of the speed control amplifier 1 is connected to an input terminal 22B of the memory 22 through an A/D converter 19. An output terminal 22C of the memory 22 is connected to a divider 2, a differentiator 12, a constant setter 15, and a divider 17 through a D/A converter 23. The parts comprising the converters 19, 21, and 23 and the memory 22 are external elements added to the conventional vector control system (FIG. 1) and are referred to as a "memory system." As illustrated in the embodiment of FIG. 10 and FIG. 11, there can be a case where either of the converters 19 and 20 is not used, but the memory means is always used. The data which are used or registered in this memory means show the relationship between inputs (torque T and speed $\omega_r$) and outputs (secondary magnetic flux $\phi_2$) is called the "magnetic flux $\phi_2$ relation" as referred to in the following.

The operation of the vector control apparatus having the above arrangement in FIG. 5 will be described below.

The signal representing the rotation speed $\omega_r$ is input to the memory 22 through the A/D converter 21. A signal representing the torque T from the speed control amplifier 1 is input to the memory 22 through the A/D converter 19. Three-dimensional plane data representing the relationship between the rotation speed $\omega_r$, the torque T, and the secondary flux $\Phi_2$ is stored in the memory 22.

Figure 6:
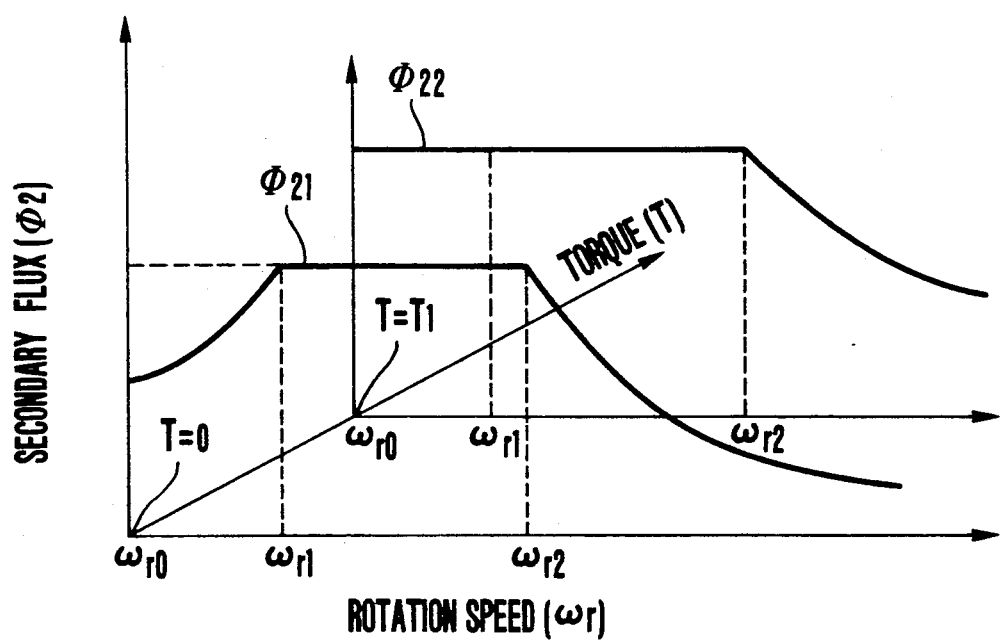
FIG. 6 is a graph showing the contents of a memory shown in FIG. 5.

FIG. 6 shows an example of data stored in the memory 22. Referring to FIG. 6, the $\omega_r$-$\Phi_2$ plane of the rotation speed $\omega_r$ and the secondary flux $\Phi_2$ indicates only a case wherein the torques are zero and $T_1$. More specifically, if T=0, then the secondary flux $\Phi_2$ is gradually increased when the rotation speed $\omega_r$ is less than $\omega_{r1}$, as indicated by a curve $\Phi_{21}$. In the range between the rotation speeds $\omega_{r1}$ and $\omega_{r2}$, the secondary flux $\Phi_2$ has a predetermined maximum value. If the rotation speed exceeds $\omega_{r2}$, the secondary flux $\Phi_2$ is gradually decreased. However, if the torque T is increased and reaches $T_1$, the secondary flux $\Phi_2$ has a maximum value in the range between $\omega_{r0}$ and $\omega_{r2}$, as indicated by a curve $\Phi_{22}$. The torque T and the rotation speed $\omega_r$ are input as address signals to the memory 22 from the input terminals 22B and 22A, respectively. The secondary fluxes $\Phi_2$ (e.g., $\Phi_{21}$ and $\Phi_{22}$) are solely output from the memory 22.

The data value of the secondary flux $\Phi_2$ is determined to cause the loss L to fall within the allowable range. The secondary flux $\Phi_2$ is used together with the torque T and the rotation speed $\omega_r$ to calculate slip speed $\omega_s$, the exciting current $i_0$, and the torque current $i_{1q}$ according to equations (1), (2), and (3) which maintain the relations in vector control.

Figure 8:
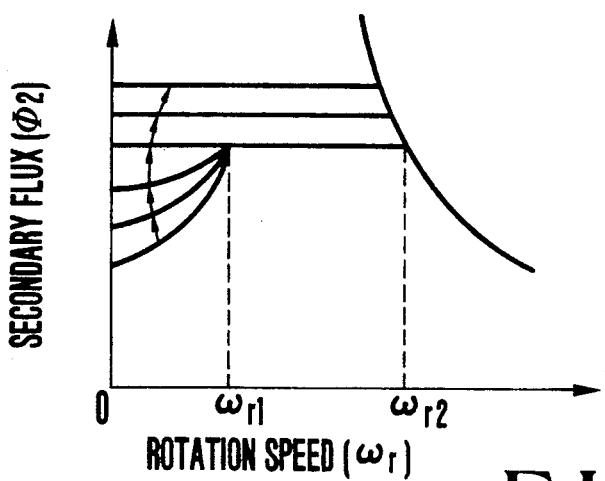
Figure 9:
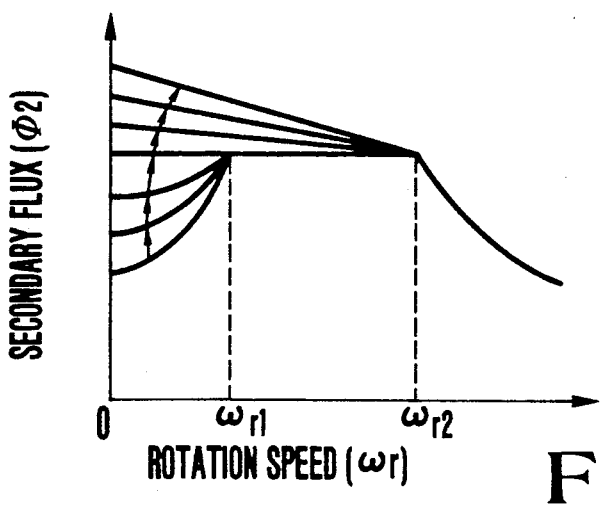

Data stored in the memory 22 is not limited to the one shown in FIG. 6. Data shown in FIGS. 7, 8, and 9 may be stored in place of the data shown in FIG. 6. Arrows in FIG. 7, 8, and 9 show directions of increases in torque T.

Figure 7:
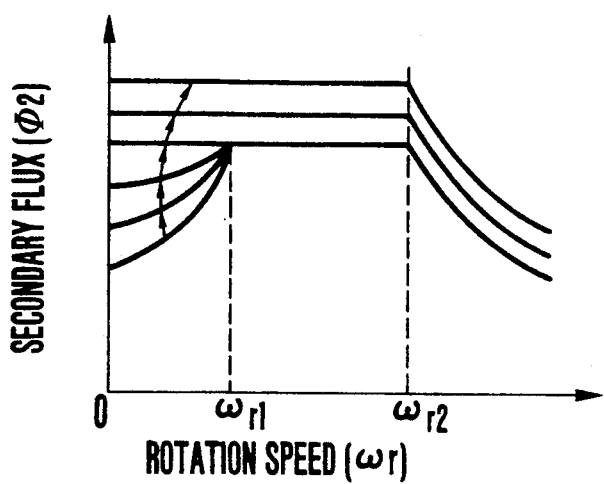
FIGS. 7, 8, and 9 are graphs showing different contents of the memory shown in FIG. 5.

The data shown in FIG. 7 is used in a case wherein both the induction motor and the power source have sufficient margins and a large torque is required even at a high speed. The data shown in FIG. 8 is used in a case wherein the induction motor has a sufficient margin but a large torque is required at intermediate and low speeds. The data shown in FIG. 9 is used in a case wherein neither the induction motor nor the power source have margins and a large torque is required at a low speed.

Since the vector control parameters are represented by equations (1), (2), and (3), equation (2) yields relation $\Phi_2 = \Phi_2(i_0)$. A substitution of this relation into equations (1) and (3) yields equations (1) and (3) as a function of $i_0$. Therefore, it is apparent that the secondary flux $\Phi_2$ need not be used.

For example, instead of determining the secondary flux $\Phi_2$ by the torque T and the rotation speed $\omega_r$, the exciting current $i_0$ having one-to-one correspondence with the secondary flux $\Phi_2$ is determined by the torque T and the rotation speed $\omega_r$. By using equations obtained by eliminating the secondary flux $\Phi_2$ from equations (1) and (3), the torque current $i_{1q}$ and the slip speed $\omega_s$ are calculated to obtain the same result as described above. A technique without using the secondary flux $\Phi_2$ will not depart from the spirit and scope of the invention.

FIG. 10 is a block diagram showing another embodiment of the present invention. The same reference numerals as in FIG. 5 denote the same parts in FIG. 10, and a detailed description thereof will be omitted.

Referring to FIG. 10, data representing rotation speed $\omega_r$ is input to a speed control amplifier 1. The output terminal of the speed control amplifier 1 is connected to an input terminal 22B of a memory 22 through an A/D converter 19. An output terminal 22C of the memory 22 is connected to a divider 2, a differentiator 12, a constant setter 15, and a divider 17 through a D/A converter 23.

In operation, the data of rotation speed $\omega_r$ is input to the speed control amplifier 1. Data of the torque T as an output from the speed control amplifier 1 is input to the memory 22 through the A/D converter 19.

The data shown in FIG. 6 is prestored in the memory 22. Even if the torque T is large, the second flux $\Phi_2$ is set to be large ($\Phi_{22}$) at a low speed. The secondary flux $\Phi_2$ is changed by only the signal of the torque T. The shape of the curve ($\Phi_{22}$) is not changed. In other words, the curve in a region below $\omega_{r1}$ cannot be as in $\Phi_{21}$.

In this case, the secondary flux $\Phi_2$ is determined so that the loss L falls within the tolerance. Using the secondary flux $\Phi_2$ as a parameter, the torque T and the rotation speed $\omega_r$ are used to obtain a slip speed $\omega_s$, an exciting current $i_0$, and a torque current $i_{1q}$, all of which maintain the relations of vector control.

FIG. 11 shows still another embodiment of the present invention. The same reference numerals as in FIG. 5 denote the same parts in FIG. 11, and a detailed description thereof will be omitted.

Referring to FIG. 11, data of rotation speed $\omega_r$ is inputted to an input terminal 22A of a memory 22 through an A/D converter 21. An output terminal 22C of the memory 22 is connected to a divider 2, a differentiator 12, a constant setter 15, and a divider 17 through a D/A converter 23. A DIP (Dual Inline Package) switch 24 is connected to an input terminal 22B of the memory 22. Data of a desired torque T can be externally entered by properly setting the DIP switch 24.

The memory 22 prestores secondary fluxes $\Phi_2$ corresponding to values of the rotation speed $\omega_r$ and the values of the torque T. For example, the data shown in FIG. 6 where the value of the torque T is predetermined is stored in the memory 22. By supplying the torque T by setting the DIP switch 24 and the rotation speed $\omega_r$ as address signals, the corresponding secondary flux $\Phi_2$ can be solely output from the memory 22. The data to be stored in the memory 22 may be ones shown in FIGS. 7, 8, and 9.

In the above three embodiments, the data stored in the memory 22 is determined so as to satisfy the following two points:

(1) When the absolute value $|\omega_r|$ of the rotation speed $\omega_r$ is small and the torque T is small, the speed variation $\Delta\omega_r$ is reduced to obtain smooth rotation.

For this purpose, the loss L is increased within the tolerance, and the slip speed $\omega_s$ is increased. The slip speed $\omega_s$ is determined such that the torque T and the rotation speed $\omega_r$ are designated to obtain the corresponding secondary flux $\Phi_2$ and that the torque T and the secondary flux $\Phi_2$ are used to calculate the slip speed $\omega_s$, the exciting current $i_0$, and the torque current $i_{1q}$ so as to maintain the vector control relations (i.e., to establish equations (1), (2), and (3)).

(2) When the torque T is increased, the loss L is reduced.

In this case, the speed variation $\Delta\omega_r$ is sacrificed to reduce the slip speed $\omega_s$. Therefore, the slip speed $\omega_s$ is determined to minimize the loss L.

Since $\omega_s = TR_2/\Phi_2^2$, an increase in torque T causes a proportional increase in slip speed $\omega_s$ in the conventional constant torque and output characteristics. However, according to the present invention, the secondary flux $\Phi_2$ is determined by the torque T and the rotation speed $\omega_r$. As compared with the conventional case wherein the slip speed $\omega_s$ is increased in proportion to the torque T, the slip speed $\omega_s$ can be greatly reduced. Therefore, the loss L can be minimized at a constant torque T.

As shown in FIG. 4, the conventional loss characteristic curve is an elliptical curve as indicated by symbol $L_1$. In this case, the corresponding torque T1 is represented by the alternate long and short dashed line. The operating point of the induction motor is represented by symbol $\overline{P}$. However, according to the present invention, the operating point P can be shifted to Pm by controlling the slip speed $\omega_s$ thereby reducing the loss as indicated by symbol $L_2$.

(3) A means for realizing the present invention can be implemented by adding relatively inexpensive memory elements and the like.

What is claimed is:

1. A vector control apparatus for an induction motor comprising:

A) a vector control system comprising:
  i) means for generating a torque command T in response to an actual rotation speed $\omega_r$, obtained from means for detecting a rotation speed of said induction motor, and in response to a speed command $\dot{\omega}_r$;
  ii) means for receiving said torque command T and a secondary flux command $\phi_2$ and calculating, as a function of a vector relational equation, a variable exciting current $i_0$, a torque current $i_1q$, and a slip speed $\omega_s$, using predetermined circuit constants of said induction motor, including an inductance and a resistance; and
  iii) means for supplying predetermined three-phase current in response to said $i_0$, $i_1q$, and $\omega_s$, to said induction motor, including a vector analyzer, a vector oscillator, a three-phase signal generator, a current control amplifier, and a power amplifier;

B) a memory system comprising:

signal conversion means 19, 21 for converting said torque command T and said actual rotation speed $\omega_r$ into corresponding data;

memory means 22 for receiving said data corresponding to said torque command T and said actual rotation speed $\omega_r$, and generating data corresponding to a desired secondary magnetic flux $\phi_2$ in accordance with a predetermined magnetic flux relation;

signal conversion means 23 for converting said data corresponding to a desired secondary magnetic flux $\phi_2$ to a magnetic flux command;

said magnetic flux command being fed back as said secondary magnetic flux command $\phi_2$ to be received by said means for receiving said torque command T and a secondary flux command $\phi_2$ and calculating, as a function of a vector relational equation, an exciting current $i_0$, a torque current $i_1q$, and a slip speed $\omega_s$, using predetermined circuit constants of said induction motor, including an inductance and a resistance; and said predetermined magnetic flux relation between T, $\omega_r$, and $\phi_2$ being determined such that when T is large the secondary magnetic flux $\phi_2$ is increased, within a range where the ratio of the motor loss L to T (T/L) can reach a maximum value, in such a way as to minimize the slip speed $\omega_s$, and when T is small and said actual rotation speed is less than a predetermined value, the secondary magnetic flux $\phi_2$ is reduced in such a way as to reduce the ripple of said actual rotation speed $\omega_r$, and to increase said slip speed $\omega_s$, within an allowable range of the loss L.

* * * * *